United States Patent [19] [11] 3,867,572
Taplin et al. [45] Feb. 18, 1975

[54] ELECTRO-OPTICAL READER FOR TRANSLATING PRINT INTO ELECTRIC SIGNALS

[75] Inventors: John F. Taplin, West Newton; Richard W. Carman, Foxboro, both of Mass.

[73] Assignee: Taplin Business Machines Incorporated, Burlington, Mass.

[22] Filed: June 1, 1973

[21] Appl. No.: 365,878

[52] U.S. Cl. .......... 178/7.6, 178/DIG. 27
[51] Int. Cl. .......... H04n 1/24
[58] Field of Search .......... 178/7.6, DIG. 27, 7.3 R; 355/73, 76; 346/129, 133

[56] References Cited

UNITED STATES PATENTS

| | | | |
|---|---|---|---|
| 2,864,886 | 12/1958 | Lemmon | 178/7.1 |
| 3,502,803 | 3/1970 | Bigenwald | 178/6 |
| 3,548,096 | 12/1970 | Reese | 178/7.1 |

OTHER PUBLICATIONS

Griffiths and Nettles, "Media Transporting," May, 1972, p. 3668, Vol. 14, No. 12, IBM Technical Disclosure Bulletin.

Anderson and Mercer "Document Seperator," March, 1972, p. 3137, Vol. 14, No. 10, IBM Technical Disclosure Bulletin.

*Primary Examiner*—Howard W. Britton
*Assistant Examiner*—Michael A. Masinick
*Attorney, Agent, or Firm*—Erwin Salzer

[57] ABSTRACT

A disk scanner includes means for imparting an arcuate shape to documents and for advancing the same in the direction of the axis of said arcuate shape. The scanner is provided with a substantially linear, stationary light source for illuminating the document as it is scanned. This light source is arranged or oriented in the direction of the aforementioned axis. The scanner is provided with stationary light sensing means, e.g., photodiodes, for sensing light emitted from said light source and reflected from a document. These light sensing means or light sensors are axially spaced from said light source. A plurality of angularly displaced illuminating lenses is mounted on a rotatable lens support, or disk, whose axis of rotation is arranged in coaxial relation with the above light source. Mounted on the lens support or disk is further a plurality of angularly displaced objective lenses arranged to focus images of the illuminated points of the document upon the above light sensor means.

15 Claims, 7 Drawing Figures

ELECTRO-OPTICAL READER FOR TRANSLATING PRINT INTO ELECTRIC SIGNALS

BACKGROUND OF THE INVENTION

This invention relates to electro-optical readers for translating print on a document into electric signals. Such readers, or scanners, have a long development history but, nevertheless, are still subject to serious limitations. It is the primary object of this invention to provide improved readers, or scanners, which lend themselves particularly well inter alia for reading bar-coded information.

One family of devices of the kind under consideration are CRT flying spot scanners. The light intensity which the phosphors of CRT flying scanners can emit tends to be relatively small, and this results in considerable difficulties.

Facsimile-type scanners are predicated on mounting the document to be read on a rotating drum and moving a light source and a light sensor simultaneously relative to the rotating drum in a direction longitudinally thereof. This scanning principle does not lend itself to the processing of data, primarily because its scanning speeds are much too low for this particular application.

Other scanners rely on rocking mirrors for establishing a scanning raster; but these scanners are also subject to critical limitations.

Among the scanners specially designed for data processing, or rapid information retrieval, are those wherein a document is bent to arcuate form or shape and moved at a relative small speed in the general direction of its axis of curvature, and simultaneously scanned by a rotating scanning disk moving transversely to the direction in which the document is advanced. The scanning disk supports a plurality of incandescent lamps and a plurality of condensor lenses for illuminating successive points of a document to be scanned, and further supports a plurality of objective lenses for focusing light reflected from these points upon fixed photo sensor means.

These devices cannot be rotated at high angular velocities because the incandescent projection lamps supported by their disks cannot withstand high centrifugal forces whose direction is ever changing. Even if the number of revolutions per minute of their scanning disks is kept small, the useful life of the incandescent filaments of their projection lamps supported by, and rotating jointly with, their scanning disks, is extremely short. The prior art scanning systems under consideration require slip rings to energize their rotatable light sources, or projection lamps. This requirement is a serious inconvenience, or complication. Since it is not possible to manufacture absolutely identical projection lamps whose light output is rigorously identical and remains unchanged during the life of the lamp, variations in the light output of the various projection lamps called for in the above referred-to prior art disk scanner result in changes of the signal strength depending upon which of several lamps is scanning a document at a particular point of time.

It is a special object of this invention to provide rotatable disk scanners which are not subject to the above drawbacks and limitations.

Further objects and advantages of the invention will become apparent as this specification proceeds.

SUMMARY OF THE INVENTION

A system embodying this invention includes arcuate means for imparting an arcuate shape to a document and means for moving the document in the direction of the axis of said arcuate shape. A single substantially linear stationary light source is arranged in coaxial relation with said axis. The system further includes a stationary planar array of light sensor means for sensing light emitted from said light source and reflected from a document being scanned. The linear light source and the axis of said arcuate means are arranged to lie inside the plane defined by the array. A rotatable lens support has an axis of rotation arranged in coaxial relation with said light source, but said axis of rotation of said lens support is axially spaced from said light source. Fixedly mounted on the lens support is a plurality of angularly displaced illuminating lenses for directing light emanating from said light source to successive points of an arcuately shaped document, and further fixedly mounted on said lens support is a plurality of angularly displaced objective lenses for focusing images of said successive points of an arcuately shaped document directly on said array. Said illuminating lenses and said objective lenses are the only optical means interposed between said linear light source and said array determining the geometry of the light path from the former to the latter.

DESCRIPTION OF PREFERRED EMBODIMENT

Figure 1:
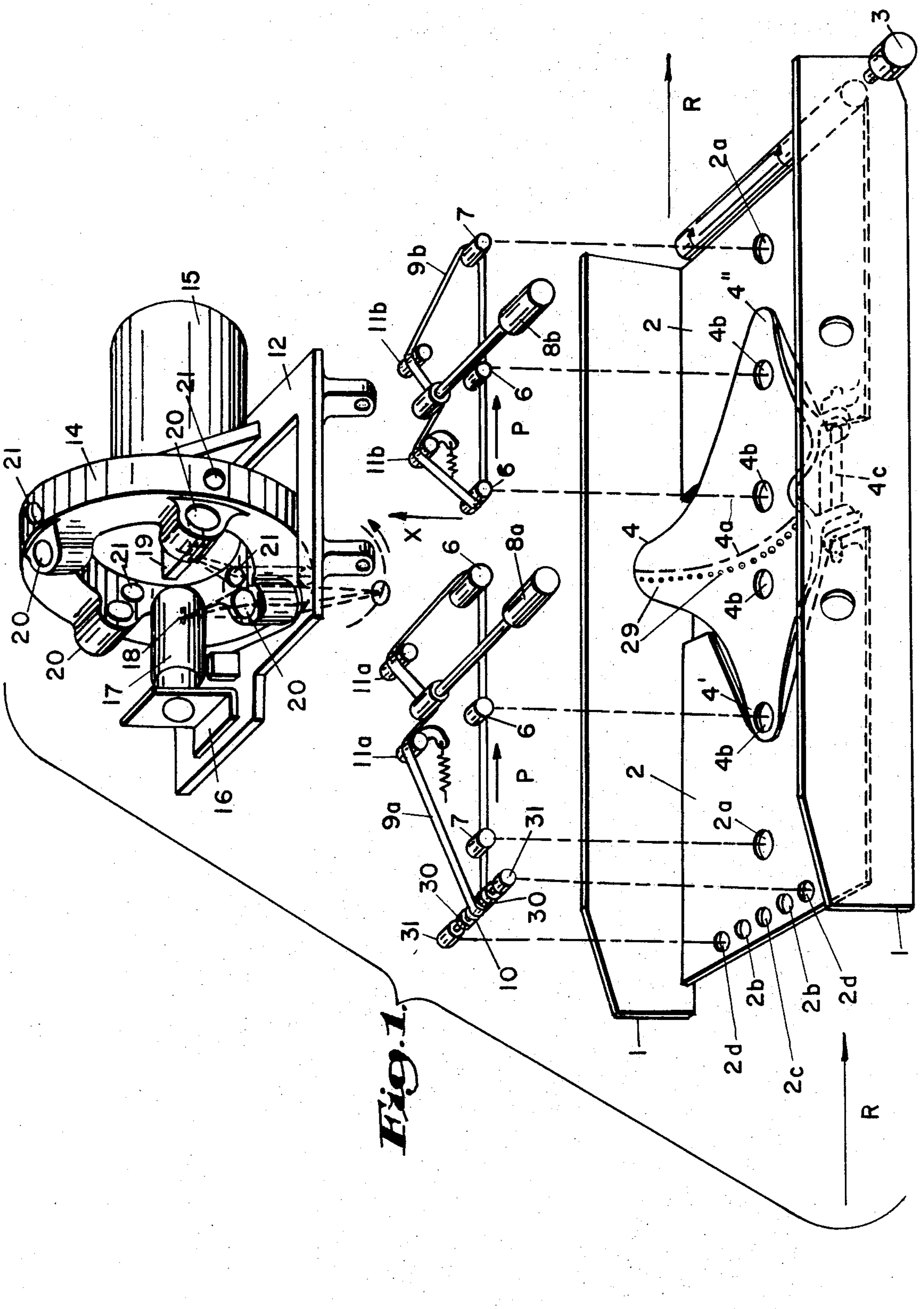
FIG. 1 is an exploded isometric and somewhat diagrammatic view of a reader embodying the present invention.

Referring now to the drawings, and more particularly to FIG. 1 thereof, the documents to be read are supplied from a hopper (not shown) arranged to the left of the structure shown in FIG. 1 to a frame structure including a pair of vertical side plates 1 and a pair of horizontal bed plates 2. Side plates 1 and bed plates 2 form a U-shaped passage or channel through which documents are moved in the direction of arrows R by means which will be described below more in detail. A transport roller 3 is arranged at the output end of the reader, and a substantially saddle-shaped document support 4 is arranged between the juxtaposed or inner ends of bed plates 2. Document support 4 is a means for imparting an arcuate shape to documents resting on it and moving in the direction of arrows R. Document support 4 has an arcuate read zone 4*a* encompassing approximately 90° and having a length of approximately 8 1/2 inches, which is the standard width of documents to be read. The document support 4 is provided with four aligned apertures 4*b*, and each bed plate 2 is provided with one aperture 2*a*, the two apertures 2*a* being aligned with the four apertures 4*b*. Document support 4 is pivotable about an axis 4*c* (see also FIG. 4) which extends parallel to the direction of arrows R and parallel to the straight line defined by apertures 2*a* and 4*b*. Each aperture 2*a*, 4*b* receives a spring-biased roll 5, as clearly shown in FIG. 2. The rolls 6 are arranged above bed 2 and above document support 4 in registry with the rolls 5 in apertures 4*b*. This has been indicated in FIG. 1 by appropriate vertical dash-and-dot lines interconnecting rolls 6 and apertures 4*b*. The rolls 7 are arranged in registry with apertures 2*a* in bed plate 2 and cooperate with the rolls 5 which are arranged in apertures 2*a*. The fact that rolls 7 are arranged in registry with apertures 2*a* has been indicated in FIG. 1 by appropriate vertical dash-and-dot lines. Reference characters 9*a*, 9*b* have been applied to indicate a pair of endless conveyor belts. The endless loop formed by conveyor belt 9*a* is arranged to the left of reading zone 4*a* (as seen in FIG. 1), and conveyor belt 9*a* is also supported by a roll 10 and by two auxiliary rolls 11*a* of which one is spring-biased to impart the desired tension to conveyor belt 9*a*. The endless loop formed by conveyor belt 9*b* is arranged to the right of the reading zone 4*a* (as seen in FIG. 1) and conveyor belt 9*b* is also supported by two auxiliary rolls 11*b*. Motors 8*a*, 8*b* move belts 9*a*, 9*b* in the direction of arrows P which is the same as that of arrows R. The endless conveyor belts 9*a*, 9*b* engage the upper surface of documents arranged on bed plates 2 and on document support 4 and move such documents from left to right as seen in FIG. 1, or from right to left as seen in FIG. 2, simultaneously imparting an arcuate shape to such documents.

Reference numeral 12 has been applied to indicate a frame structure which supports a rotatable lens support 14. The latter is driven by a synchronous motor 15 having a high number of revolutions, e.g., 900 or 1,800 revolutions per min. The frame structure 12 further supports a substantially L-shaped bracket 16 which forms a support for a projection lamp 17 and its socket. Projection lamp 17 is provided with a helically wound incandescent filament 18. The helical windings of filament 18 have not been illustrated since this is a well known feature of projection lamps. The axis of filament 18 does not coincide with the axis of the envelope of the projection lamp 17, i.e., filament 18 is arranged off center (see FIG. 2). Filament 18 forms a substantially linear light source, and the axis of rotation of lens support 14 is arranged in rigorously coaxial relation with the axis of filament 18. It will be understood that projection lamp 17 and its filament 18 are stationary since they are supported by fixed bracket 16. Reference numeral 19 has been applied to indicate a stationary light sensor for sensing light emitted from light source 18 and reflected from a portion of a document as it passes through the arcuate reading zone 4*a* on document support 4. Light sensor 19 is substantially planar and arranged in such a fashion that the axis of light source 18 is situated in the plane defined by sensor 19. Sensor 19 may be a linear array of photodiodes (see FIG. 2*a*) and is spaced from light source 18 in the direction of the axis of the light source 18, as clearly shwon in FIGS. 1 and 2. The axis of rotation of lens support 14 is also axially spaced from light source 18, i.e., in the direction of the axis of light source 18. As seen in FIG. 2 the axis of rotation 60 of lens support 14 is arranged to the left of light source 18 and to the left of light sensor 19. Lens support 14 supports a plurality or four illuminating lenses 20 which are angularly displaced 90° and fixedly mounted on lens support 14. Illuminating lenses 20 direct light emanating from light source 18 to successive points of a document overlaying the reading zone 4*a* of document support 4. The optical axes of illuminating lenses 20 are spaced from light source 18 in axial direction, as best shown in FIG. 2 wherein reference letter s has been applied to indicate the axial spacing between light source or filament 18 and the optical axis of illuminating lenses 20. Lens support 14 further supports a plurality or four objective lenses 21 fixedly mounted on support 14. Objective lenses 21 form images of successive points of a document overlaying the reading zone 4*a* of document support 4 on the lower surface of planar light sensor 19.

Figures 2, 2A:
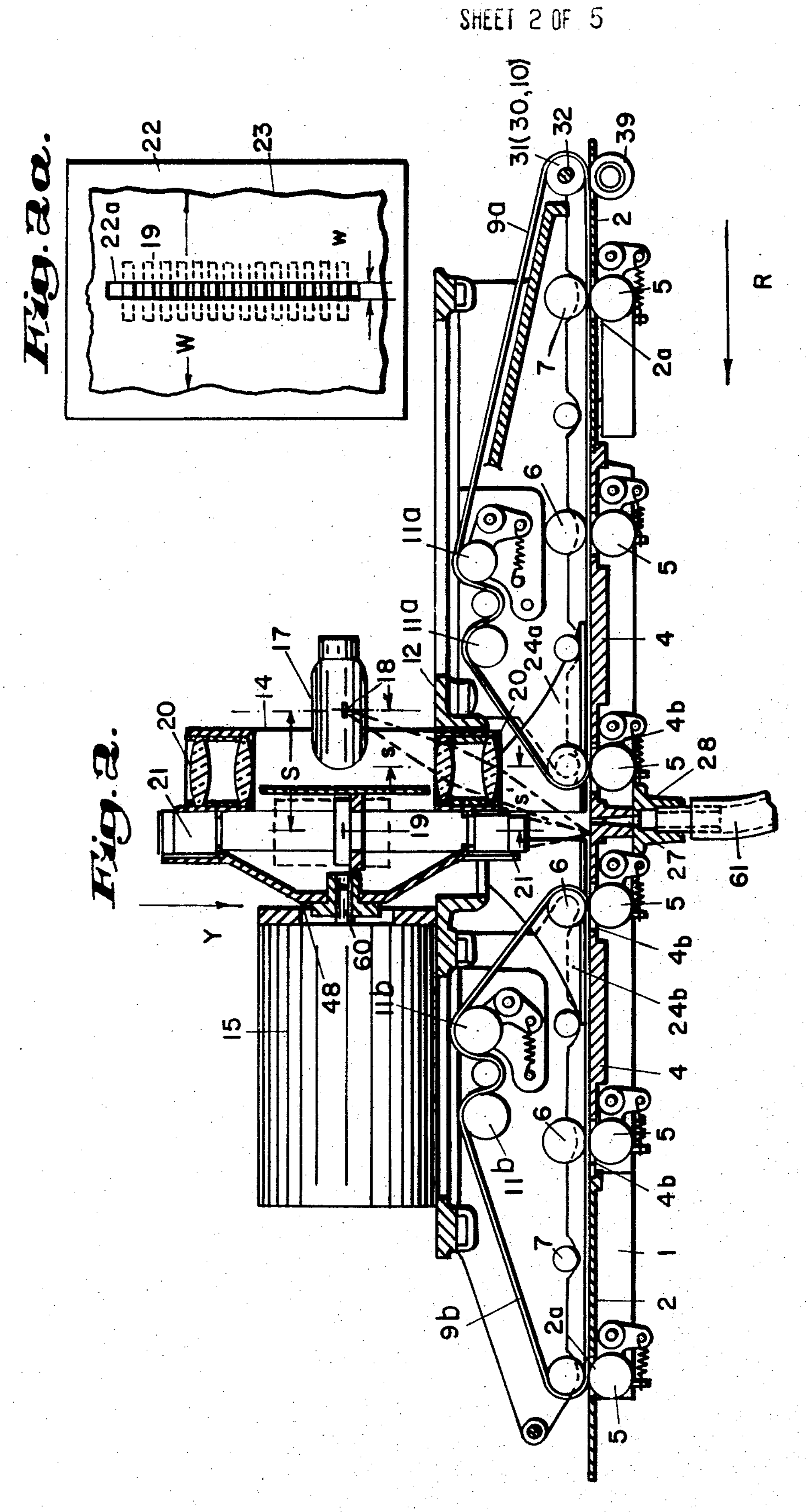
FIG. 2 is, in essence, a side elevation and longitudinal section of the reader shown in FIG. 1, both FIGS. 1 and 2 indicating by arrows R the direction of the movement of documents from the input end to the output end of the reader.
FIG. 2*a* is a diagrammatic front view of the photosensor means or sensor array of the structure of FIG. 1 seen in the direction X of FIG. 1.

Referring now to particularly FIG. 2*a*, a light sensitive array 19 is formed by a plurality of aligned photosensitive cells. An opaque mask 22 is arranged in front of array 19, and has a small slit 22*a* therein limiting the incident light upon array 19. Reference character 23 has been applied in FIG. 2*a* to indicate diagrammatically the real image of an illuminated spot of a document in reading zone 4*a* of document support 4 formed by one of the objective lenses 21 on mask 22. The width $w$ of slit 22*a* is considerably less than the width W of image 23. As a result of this configuration the black and white contrasts of a document in the process of being read are rendered by electrical signals which are substantially rectangular pulses. If the width of slit 22*a* in mask 22 were wider or more or less equal to the width W of image 23, the output signals emitted by light sensitive array 19 would have a relatively small rate of rise and a relatively small rate of decay, thus approaching more or less sinusoidal curves rather than having the character of rectangular pulses.

Figure 4:
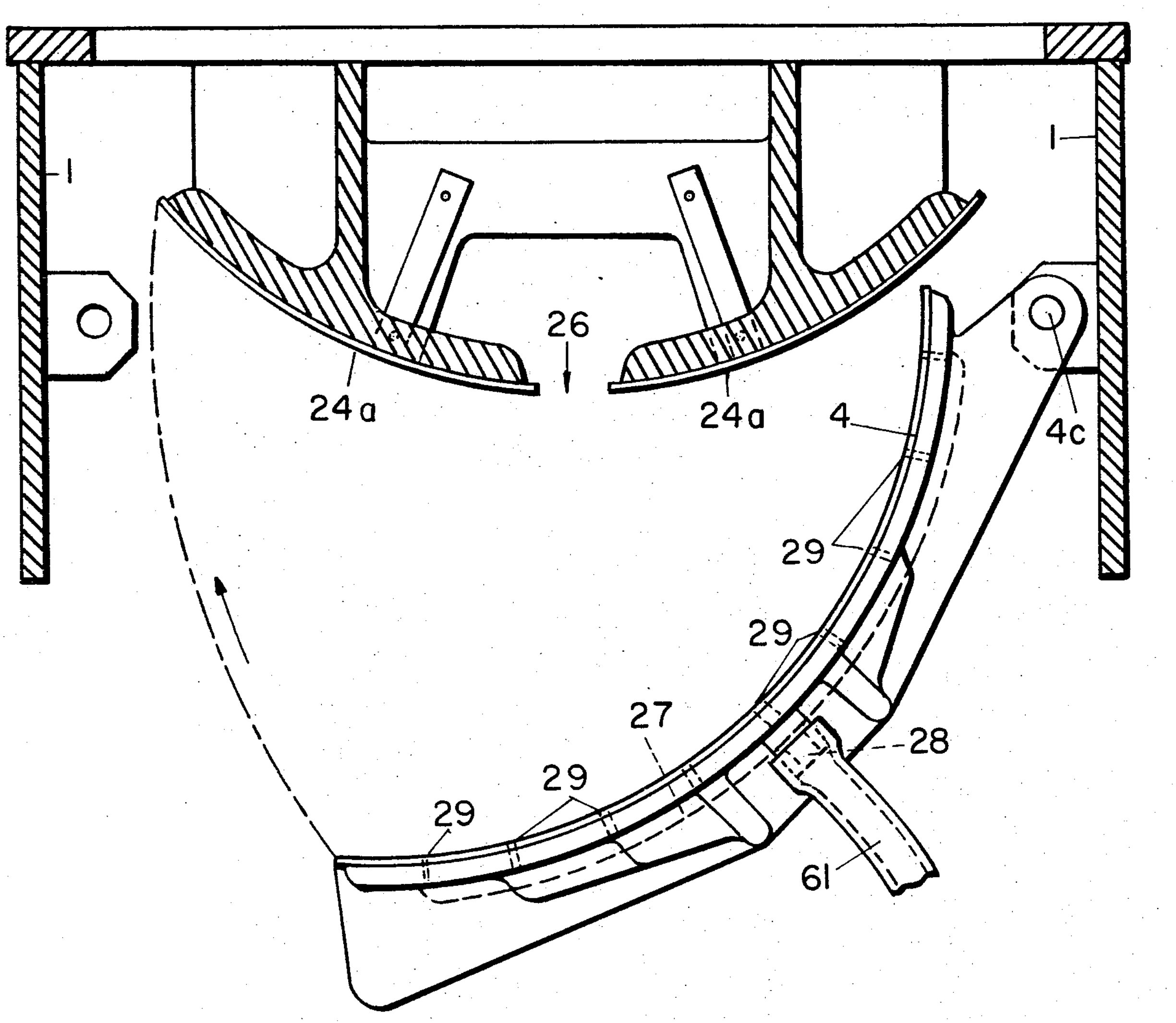
FIG. 4 is a transverse section of the document support shown in FIG. 3 in top plan view and of parts immediately associated with that support.

In order to guide a document from the input end to the output end of the reader and to impart an arcuate shape to it while thus in transit, the document should be guided through an appropriate arcuate channel. FIG. 4 shows the document support 4 pivoted out of its normal operating position about the pivot axis 4*c*. This becomes necessary if a jam occurs and crumpled paper must be rapidly removed to minimize downtime.

Figure 3:
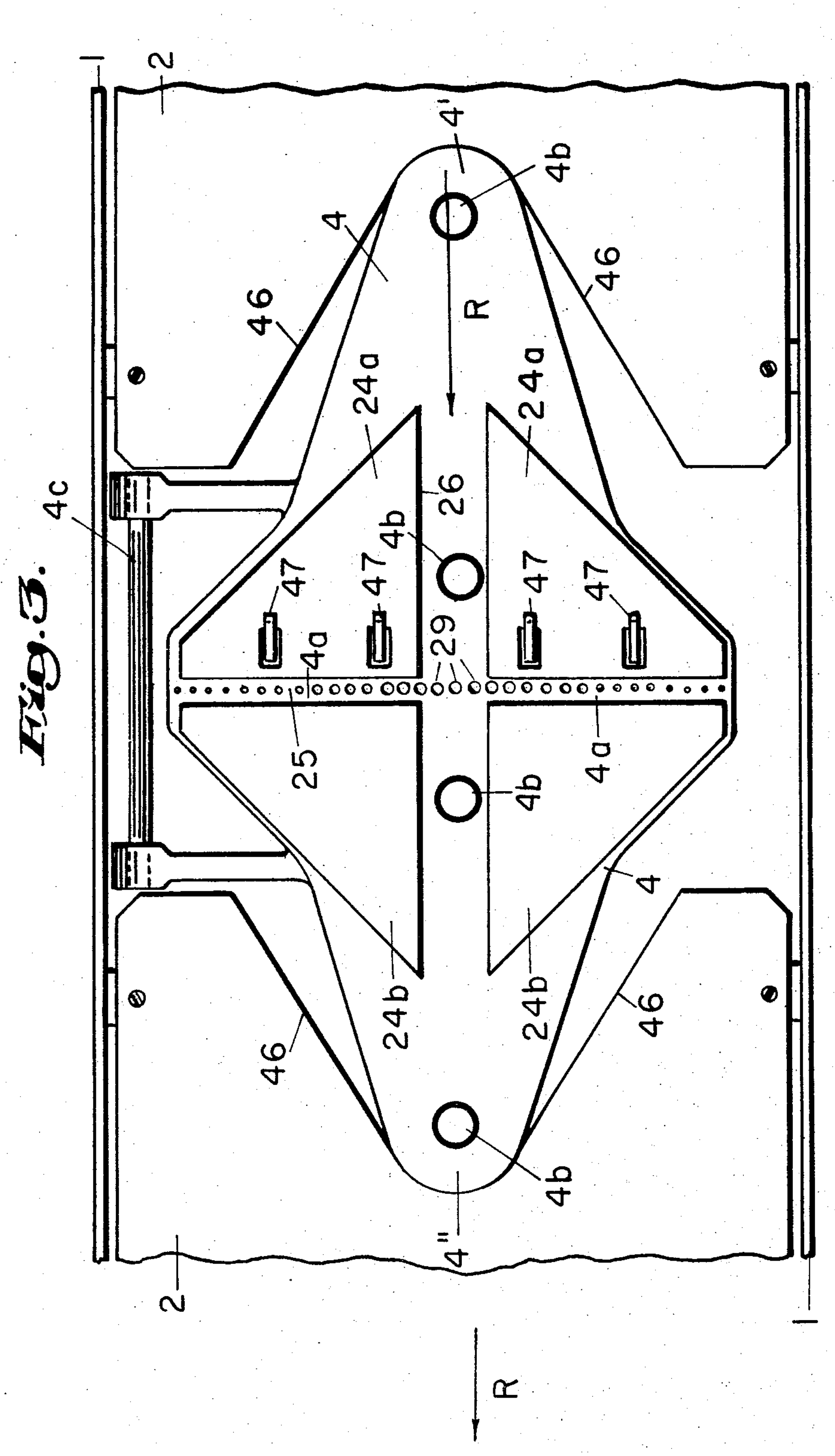
FIG. 3 is a top-plan view of the document support of the structure of FIGS. 1 and 2 seen in the direction of the arrow Y of FIG. 2.

As best shown in FIGS. 3 and 4 a pair of document support covers 24*a*, 24*b* is arranged above document support 4. These covers 24*a*, 24*b* form a narrow gap between them and the document support 4 when the latter is in place, i.e., not pivoted out of position as shown in FIG. 4. As shown in FIG. 3 one document support cover 24*a* is arranged to one side and the other document support cover 24*b* is arranged to the other side of reading zone 4*a* of document support 4. This subdivision is necessary to allow lenses 20 to illuminate the reading zone 4*a* and to allow objective lenses 21 to project real images of the illuminated points of a document on the reading zone 4*a* upon light sensor means 19. Reference numeral 25 has been applied to indicate the open space or slot between the pair of covers 24*a* and 24*b* exposing the reading zone or the median region 4a of document support 4. Lenses 20 are arranged on lens support 14 so as to illuminate region 4a through open space or slot 25, and lenses 21 are arranged on lens support 14 in such a way that the optical axes thereof intersect document support 4 at the median or reading region 4a thereof. This is particularly apparent from FIG. 2.

The friction between the upper surface of document support 4 and any document moving along the document support 4 ought to be minimized. This may be achieved by coating the upper surface of document support 4 with an antifriction layer or antifriction lining. A lining of polytetrafluorethylene is particularly desirable for minimizing the friction between support 4 and a document moving along support 4.

It is desirable to progressively impart the desired arcuate shape to any document to be read and to return the document upon reading progressively to its initial planar shape. To achieve this end the width of document support 4 increases progressively from its intake end 4' to its exposed median region or reading region 4a, and decreases progressively from its exposed median region or reading region 4a to the output end 4'' thereof. The radius of curvature of document support 4 remains unchanged from the intake end 4' thereof to the exposed median region 4a, and from the latter to the output end 4'' thereof.

In FIG. 3 the input or intake end of document support 4 has been designated by the reference character 4'. Here the width of document support 4 is smallest. The width of support 4 increases progressively from its end 4' toward the median zone 4a. In like fashion the width of support 4 decreases progressively from the median region 4a to the end 4''. The geometry of cover means 24a, 24b is similar to that of support 4 so as to maintain a gap of uniform width between support 4 and its cover means 24a, 24b, i.e., support 4 and cover means 24a, 24b are cylindrical surfaces.

Each of the pair of document support covers 24a, 24b has a slot 26 extending substantially at right angles to the median region 4a of document support 4. The endless conveyor belts 9a, 9b which are arranged above support 4 extend in the direction of slot 26 and engages one of the rollers 5 as long as no document is moved through the reader. When a document is moved through the reader endless belts 9a, 9b engage the upper surface of the document and the rollers 5 engage the lower surface of the document.

As shown in FIG. 4 document support 4 is provided with an internal cavity 27 substantially coextensive with the median region 4a of document support 4. Document support 4 is further provided with a hose connector 28 communicating with cavity 27 for attaching a hose 61 to document support 4 allowing to evacuate cavity 27 partially, i.e., to establish a semi-vacuum in cavity 27. Document support 4 is further provided with perforations 29 extending from cavity 27 to the surface of document support 4 and juxtaposed to cover means 24. This arrangement of parts makes it possible to position precisely the document to be read in the arcuate or cylindrical surface in which it ought to be when being read. The suction of the vacuum in cavity 27 exerted upon any document while being fed through the reading zone 4a is overcome by the action of conveyor belts 9a, 9b which move the document in the direction of arrows R.

It has been found that for best results the cross-sectional area of perforations 29 should not be uniform. For best results the cross-sectional area of the perforations in the center of the document support 4, or in the center of its arcuate reading region 4a, should be largest and the cross-sectional area of perforations 29 ought to decrease progressively toward the sides of the document support 4, i.e., ought to decrease progressively as their distance from the center of the arcuate reading region 4a increases. The cross-sectional areas of perforations 29 ought to be smallest at the lateral sides of the document support 4. This grading of perforations 29 is clearly shown in FIG. 3.

The reader further includes means arranged at the input end thereof for sensing the thickness of the document supplied to the reader. When said thickness exceeds a predetermined range which occurs when two documents to be read adhere to each other or stick to each other, the sensing device becomes operative and energizes a signalling circuit, or deenergizes a signalling circuit, and the change of state of the signalling circuit may be used to cause automatic stopping of the reading device so that the existing faulty condition may be removed.

It is further desirable to arrange at the input end or intake of the reader some means allowing to render the reader selectively either operative or inoperative. In order to make the reader operative, the document to be read must be moved under the endless conveyor belt 9a and under roll 10. If this is done, the document will enter the reader, and be transported through it.

The shaft 32 supporting roll 10 further supports a pair of thickness sensing rolls 30 and a pair of pinch rolls 31. Rolls 30 and 31 are fixedly mounted on shaft 32 supporting roll 10 and rotate jointly with the aforementioned shaft (see FIG. 5).

Figures 2B, 5:
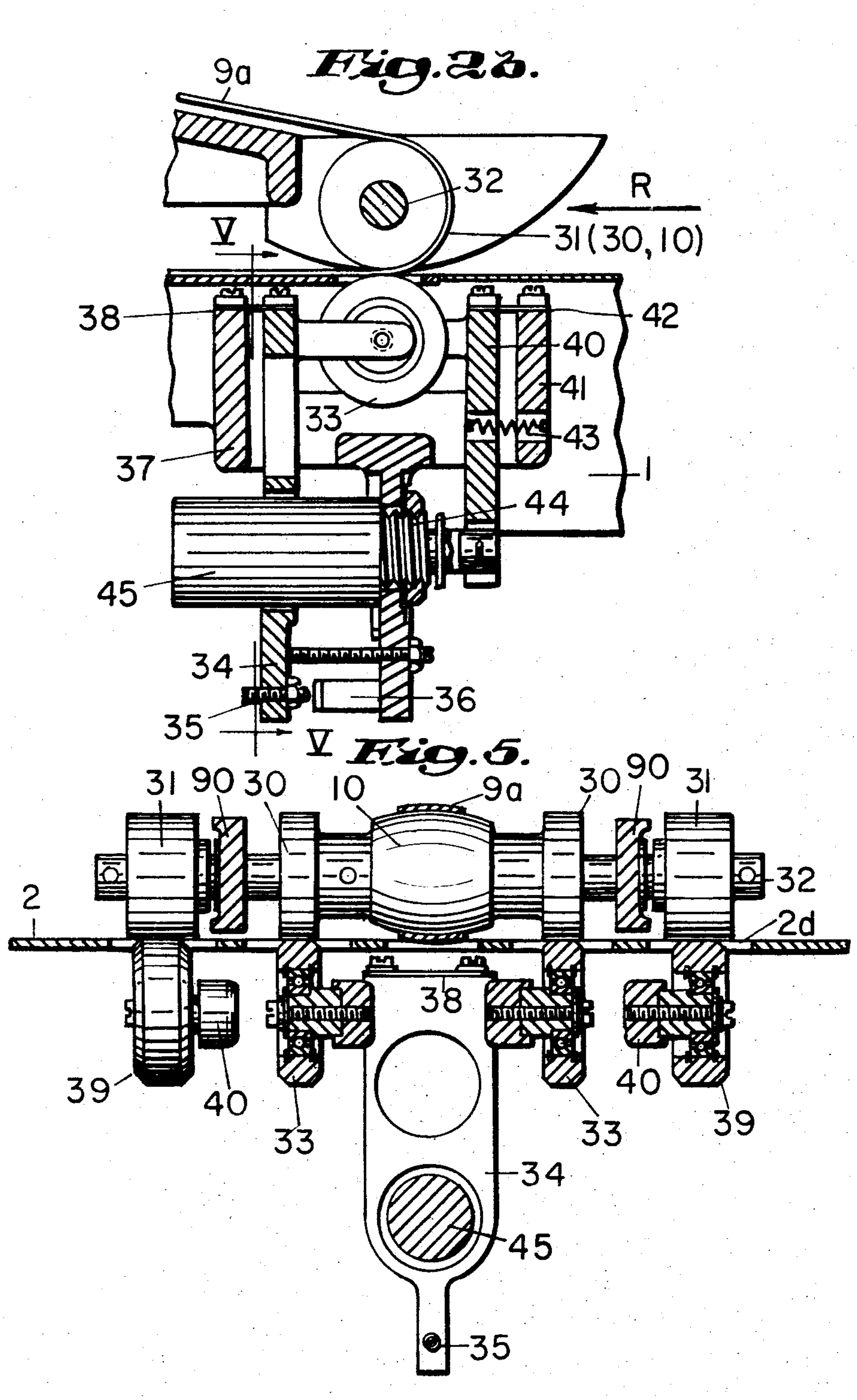
FIG. 2*b* is a side elevation of auxiliary means arranged at the input end of the reader more diagrammatically but less completely shown in FIGS. 1 and 2.
FIG. 5 shows details of the structure of FIG. 2*b* and is a section V—V of FIG. 2*b*, deleting some details more fully shown in FIG. 2*b*.

In FIG. 2b and in FIG. 5 reference character 32 has been applied to indicate the shaft supported by two supports 90 and supporting rolls 10, 30 and 31. A rotatable thickness sensing roll 33 is arranged below each thickness sensing roll 32 and rolls 33 are mounted on a common support structure 34 having an electrical contact 35 movable relative to the fixed electrical contact 36. The common support structure 34 for lower thickness sensing rolls 33 is supported by a fixed support 37 by the intermediary of a flexible strap 38. Support 37 is, in turn, fixedly supported by frame 1 (see FIG. 1). When the thickness of a paper supplied to the reader exceeds a predetermined value, the spacing between the upper thickness sensing rolls 31 and the lower thickness sensing rolls 33 is increased. As a result, rolls 33 and their joint support 34 move in clockwise direction, as seen in FIG. 2b, against the action of the resilient strap 38. This, in turn, causes separation of the movable contact 35 from the fixed contact 36. As a result, a warning signal is emitted and/or the reader is stopped.

The bed plate 2 on the input side of the reader is provided with a central aperture 2c and with two pairs of lateral apertures 2b and 2d(FIG. 1). The lateral apertures 2b are provided to receive the lower thickness sensing rolls 33 and to allow the latter to form a pair of nips of variable width with the upper thickness sensing rolls 30.

The apertures 2d in bed plate 2 are intended to accommodate two pinch rolls 39 which form a pair of nips with the upper pinch rolls 31, as clearly shown in FIG. 5. The lower pinch rolls 39 are not apparent in FIG. 2*b* since they are arranged in registry with, and covered by, one of the lower thickness sensing rolls 33. The common support 40 of lower pinch rolls 39 is mounted on a fixed roll support 41 by means of a flexible strap 42. A tension spring 43 affixed with the ends thereof to both supports 40, 41 tends to reduce the distance between supports 40, 41 by pulling the support 40 from left to right, as seen in FIG. 2*b*. This results in a light flexing of resilsient strap 42. The lower end of support 40 is affixed to the armature of a solenoid 45 or of an equivalent electromagnetic operator for support of pinch roll arm 40. As long as solenoid 45 is de-energized, upper pinch rolls 31 are not frictionally engaged by lower pinch rolls 39. Hence no document reaching the input end of the reader will be transported through the reader though upper pinch rolls 31 are operated continuously by motor 8*a* by the intermediary of belt 9*a*, roll 10 and shaft 32. In order to transport a document from the input end of the reader through the reader the pinch rolls 31, 39 must be caused to engage under pressure. This is achieved by energizing the solenoid 45. When solenoid 45 is energized, support or pinch roll arm 40 is moved from right to left, as seen in FIG. 2*b*. This results in flexing of flexible joint or flexible strap 42, and in a slight lifting motion of lower pinch rolls 39 into frictional engagement with upper pinch rolls 31. As a result, any document supplied to the nip formed between rolls 39 and 31 will be transported through the reader. Solenoid 45 may be energized and de-energized by a central control system for the reader (not shown) which controls all the functions thereof.

Referring now more particularly to FIG. 3, it will be apparent from that figure that the bed plates 2 are provided with substantially V-shaped cut-outs 46, and that the ends 4', 4'' of document support 4 have substantially V-shaped contours and project into said substantially V-shaped cut-outs of bed plates 2. This geometry helps considerably in changing the shape of documents to be read from planar to arcuate and then back to planar.

FIG. 3 further shows that the document support cover 24*a* is provided with a plurality of spaced paper guiding fingers 47. Fingers 47 are arranged at points adjacent the median region 4*a* of document support 4 which are situated in regard to the direction of document flow upstream from the arcuate pattern formed by the ends of perforations 29. Fingers 47 and the semi-vacuum prevailing in perforations 29 ensure that the zone of the document in the process of being read is rigorously cylindrical so that the image formed on light sensing array 19 is never out of focus.

Referring now more particularly to FIGS. 1 and 2, it will be apparent that document support 4 is a cylindrical surface encompassing about 90° of a cylinder surface. Such surface is, in effect, a cylinder sector. The axis of rotation 60 of lens support 14 is coaxial with the geometrical axis of the reading zone or the median zone 4*a* of document support 4. The objective lenses 21 fixedly mounted on lens support 14 have an optical axis which is oriented radially and arranged to intersect the surface of the reading zone 4*a* of document support 4 at right angles, whatever the instantaneous position of lenses 21 relative to the document support 4. Light sensor 19 is arranged at the end of the optical axis of lenses 21 remote from document support 4. The light source 18 is arranged in axially spaced relation from lens support 14 in coaxial relation with the axis of rotation 60 of lens support 14. The light source 18 has a predetermined axial spacing from the reading zone 4*a* of document support 4 which spacing has been designated in FIG. 2 by the reference letter S. The optical axes of the illuminating lenses 20 have a smaller axial spacing *s'* from the reading zone 4*a* of document support 4 than the axial spacing S of the reading zone 4*a* from the light source 18.

As clearly shown in FIG. 2 the side of the lens support 14 remote from light source 18 has substantially the shape of a frustum of a cone. The planar end surface 48 of lens support 16 juxtaposed to synchronous drive motor 15 forms part of a coupling allowing to couple the rotor of motor 15 directly with lens support 14 and to minimize the axial spacing between parts 14 and 15. To this end the axis of rotation of motor 15 is arranged in coaxial relation to the axis of rotation of lens support 16.

FIG. 2 further shows clearly the position of the axially inner ends of the suction producing perforations 29. The axially inner ends of perforations 29 are situated upstream from the reading zone 4*a* of document support 4 in regard to the direction of the movement of documents along document support 4 indicated by the arrows R.

When considering the drawings it will be apparent that the cover means 24*a*, 24*b* for document support 4 have been deleted in FIG. 1 for better clarity of that figure. In FIG. 1 the lower level rolls cooperating with rolls 30 and 31 have also been deleted. These lower level rolls and the parts which are associated with them are shown in detail in FIGS. 2*b* and 5. It will be further apparent that the structure shown in FIGS. 2*b* and 5 is arranged at the left hand side of what is shown in FIG. 1. FIG. 2 is seen in such a way that the right side of FIG. 2 corresponds to the left side of FIG. 1, and vice versa. In FIG. 3 all transport rolls and conveyor belt means have been deleted since these means have been clearly shown in FIGS. 1, 2, 2*b* and 5.

It will be noted that in the above structure the following parts are arranged in coaxial relation.

a. light source 18;

b. axis of rotation of lens support 14;

c. axis of document support 4;

d. linear array of light sensors 19 and slit 22*a* in mask 22, respectively;

e. axis of rotation of rotor of electric motor 15.

The opaque mask 22 having a narrow slit 22*a* shown in FIG. 2*a* might be deleted if a linear array of light sensors of extremely small width were used. Such width limitations are unnecessary if mask 22 is provided.

The suction action or vacuum action of document support 4 by which high precision focusing is achieved results in considerable pressure between a document to be read and the radially inner surface of document support 4. Because of that amount of pressure the documents to be read could hardly readily be moved through the reader if the coefficient of friction between the documents and the document support 4 were not minimized by the aforementioned coating or lining of support 4.

We claim as our invention:

1. An electro-optical reader for translating print on a document into electric signals including a. arcuate means for imparting an arcuate shape to a document and means for moving the document in the direction of the axis of said arcuate means;

b. a single substantially linear stationary light source arranged in coaxial relation with the axis of said arcuate means;

c. a planar stationary array of light sensor means spaced from said linear light source in the direction of the axis of said linear light source, the plane defined by said array including said axis of said arcuate means;

d. a rotatable lens support having an axis of rotation arranged in coaxial relation with said linear light source but axially spaced from said linear light source;

e. a plurality of angularly displaced illuminating lenses fixedly mounted on said lens support for directing light emanating from said linear light source to successive points of a document;

g. a plurality of angularly displaced objective lenses fixedly mounted on said lens support for focusing images of said successive points of said document directly on said array; and h. said plurality of illuminating lenses and said plurality of objective lenses being the only optical means interposed between said linear light source and said array determining the geometry of the path of light from said linear light source to said array.

2. An electro-optical reader as specified in claim 1 including an incandescent lamp having an envelope whose longitudinal axis is arranged parallel to, and spaced from, the axis of rotation of said lens support, said incandescent lamp including a helically wound light emitting filament whose longitudinal axis is arranged in coaxial relation to said axis of rotation of said lens support.

3. An electro-optical reader as specified in claim 1 wherein said arcuate means for imparting an arcuate shape to a document include a substantially saddle-shaped document support and a pair of document support covers forming narrow gaps between said document support and said pair of document support covers to allow the passage of documents through said gaps, and said pair of document support covers being arranged in spaced relation so as to expose the median region of said document support.

4. An electro-optical reader as specified in claim 3 wherein the surface of said document support juxtaposed to said pair of document support covers is provided with an antifriction lining.

5. An electro-optical reader for translating print on a document into electric signals comprising a. document shaping means having an input region and an output region and including a pair of bed plates of which one is arranged at said input region and the other is arranged at said output region, an arcuate document support having an end of minimal width situated adjacent one of said pair of bed plates arranged at said input region, the width of said document support increasing progressively toward a median region thereof and the width of said document support decreasing progressively from said median region thereof toward the end of said document support arranged at said output region, said document shaping means further including a document support cover covering portions of said document support and spaced substantially equidistantly from said document support so as to form a narrow channel therebetween, said document support cover exposing said median region of said document support and further exposing a strip of said document support extending in a direction longitudinally thereof;

b. a substantially linear fixed light source arranged in coaxial relation to said median portion of said document support;

c. a fixed planar array of light sensor means arranged in such a way that the axis of said median portion of said document support is situated within the plane defined by said array, said array being spaced from said linear light source in a direction longitudinally of said linear light source;

d. a lens support rotatable about said axis of said median portion of said document support, said lens support supporting illuminating lens means directing light from said fixed linear light source to said median portion of said document support and further supporting objective lens means focusing real images of illuminated points situated at said median region of said document support directly upon said array; and e. said illuminating lens means and said objective lens means being the only reflective or refractive optical elements arranged in the path of light from said linear light source to said array.

6. An electro-optical reader as specified in claim 3 wherein the juxtaposed sides of said pair of bed plates have converging cut-outs, and wherein the ends of said document support adjacent said pair of bed plates have converging contours and project into said converging cut-outs of said pair of bed plates.

7. An electro-optical reader as specified in claim 5 wherein a. said document support is provided with a manifold-forming internal cavity in said median region thereof;

b. a plurality of perforations extends from said cavity radially inwardly to the surface of said document support and has ends situated in said surface forming an arcuate pattern; and wherein c. said document support cover is provided with a plurality of spaced paper guiding fingers positioned adjacent said median region of said document support and at points which are situated in regard to the direction of document flow upstream from said ends of said perforations forming an arcuate pattern.

8. An electro-optical reader as specified in claim 3 wherein a. said document support is provided with a plurality of apertures aligned in the direction of document flow;

b. said pair of bed plates is provided with apertures aligned with said plurality of apertures in said document support;

c. spring biased rolls are arranged in said apertures of said document support and in said apertures in said pair of bed plates for engaging the lower surface of documents resting on said document support and on said pair of bed plates;

d. a first plurality of rolls is arranged above said document support and above one of said pair of bed plates to one side of said median region of said document support, each of said first plurality of rolls being arranged in registry with one of said plurality of apertures in said document support and with one of said apertures in said one of said pair of bed plates, and each of said first plurality of rolls supporting a first motor-driven endless conveyor belt; and wherein e. a second plurality of rolls is arranged above said document support and above the other of said pair of bed plates to the other side of said median region of said document support, each of said second plurality of rolls being arranged in registry with one of said plurality of apertures in said document support and with one of said apertures in said other of said pair of bed plates, and each of said second plurality of rolls supporting a second motor-driven endless conveyor belt.

9. An electro-optical reader as specified in claim 8 wherein a. one of said pair of bed plates is provided with a first pair of apertures arranged on opposite sides of a central aperture therein which is aligned with said plurality of apertures in said document support, said one of said pair of bed plates being further provided with a second pair of apertures arranged on opposite sides of said central aperture therein;
b. a fixed shaft is arranged above and parallel to said one of said pair of bed plates in the direction determined by said first pair of apertures and said second pair of apertures;
c. one of said first plurality of rolls is mounted on said fixed shaft and jointly rotatable with said fixed shaft, said one of said first plurality of rolls bieng arranged in registry with said central aperture in said one of said pair of bed plates and supporting a power driven endless conveyor belt;
d. a first pair of thickness sensing rolls is mounted on said fixed shaft and jointly rotatable with said fixed shaft, each of said pair of thickness sensing rolls being arranged in registry with one of said first pair of apertures in said one of said pair of bed plates;
e. a first pair of pinch rolls is mounted on said fixed shaft and jointly rotatable with said fixed shaft, each of said first pair of pinch rolls being arranged in registry with one of said second pair of apertures in said one of said pair of bed plates;
f. A second pair of thickness sensing rolls is mounted on a common sensing roll support and rotatable about an axis of rotation parallel to said fixed shaft, said sensing roll support being movable against spring action relative to said fixed shaft, said first pair of sensing rolls and said second pair of sensing rolls forming a pair of sensing roll nips therebetween;
g. an electric switch is controlled by the extent of the spacing between said fixed shaft and said sensing roll support and operates in response to a predetermined increase of said spacing;
h. a second pair of pinch rolls is mounted on a common pinch roll support and rotatable about an axis of rotation parallel to said fixed shaft, said pinch roll support being movable relative to said fixed shaft and said first pair of pinch rolls and said second pair of pinch rolls forming a pair of pinch roll nips therebetween; and wherein
i. an electromagnetic operating means is provided for said pinch roll support to selectively cause frictional engagement under pressure of said first pair of pinch rolls by said second pair of pinch rolls and disengagement of said second pair of pinch rolls from said first pair of pinch rolls.

10. An electro-optical reader for translating print on a document into electric signals comprising in combination a. means for transporting documents in a predetermined direction and means for imparting to said documents an arcuate shape, said arcuate-shape-imparting means including a cylindrical document support having a predetermined axis;
b. a lens support rotatable about an axis of rotation coaxial with said axis of said document support;
c. an objective lens supported by and rotatable jointly with said lens support, said objective lens having an optical axis arranged to intersect the surface of said document support at an arcuate reading zone having its center in said axis of said document support;
d. a stationary planar array of light sensitive elements positioned in such a way that said axis of said document support lies inside of the plane defined by said array and that images of said reading zone are directly focused by said objective lens on said array;
e. a substantially linear stationary light source arranged in axially spaced relation from said lens support and said array and in coaxial relation with said axis of said document support;
f. an illuminating lens supported by and rotatable jointly with said lens support for illuminating successive points of said reading zone of said document support, said illuminating lens being arranged to illuminate said reading zone by light emitted from said linear light source; and
h. said objective lens and said illuminating lens being the only optical means interposed between said linear light source and said array determining the geometry of the path of light between said linear light source and said array.

11. An electro-optical reader as specified in claim 10 wherein a. said substantially linear stationary light source is formed by a projection lamp including an envelope and a helically wound incandescent filament arranged parallel to, but spaced from, the axis of said envelope, said filament being arranged in coaxial relation with said axis of said document support; and wherein
b. a portion of said lens support on the side thereof remote from said projection lamp has substantially the shape of a frustum of a cone, the planar end surface of the converging end of said frustum of a cone shaped portion of said lens support forming a coupling means for coupling said lens support with an electric motor haivng an axis of rotation arranged in coaxial relation with said axis of said document support and with said axis of rotation of said lens support.

12. An electro-optical reader as specified in claim 10 wherein a. said document support is provided with an internal chamber capable of being evacuated and arranged immediately adjacent said reading zone of said document support;
b. said chamber is connected by a plurality of perforations with the radially inner surface of said document support, the ends of said perforations situated in said radially inner surface of said document support forming an arcuate pattern substantially parallel to said reading zone of said document support and situated upstream from said reading zone of said document support in regard to the direction of movement of documents along said document support; and wherein c. said radially inner surface of said document support is provided with a friction-decreasing lining.

13. An electro-optical reader for translating information printed on a document into electric signals including a. arcuate document supporting means for imparting an arcuate shape to a document, and means for moving an arcuately shaped document in the direction of the axis of said document supporting means;

b. a fixed planar linear array of photosensors for sensing electro-magnetic radiation reflected from a document placed on said document supporting means, said array being arranged in such a way that said axis of said document supporting means lies inside of the plane defined by said array;

c. a single linear source of electromagnetic radiation formed by a helically wound projection lamp filament arranged in coaxial relation to said axis of said document supporting means;

d. a rotatable lens support having its axis of rotation arranged in coaxial relation with said axis of said document supporting means and said linear source of electromagnetic radiation;

e. a plurality of angularly displaced illuminating lenses fixedly mounted on said lens support directing electromagnetic radiation from said linear source of electromagnetic radiation to a document on said document supporting means;

f. a plurality of angularly displaced objective lenses fixedly mounted on said lens support focusing images of points of a document placed on said document supporting means directly upon the region of said array coextensive with said axis of said document supporting means; and g. said plurality of illuminating lenses and said plurality of objective lenses being the only means determining the geometry of the path of electromagnetic radiation from said linear source of electromagnetic radiation to said array.

14. An electro-optical reader for translating information printed on a document into electric signals including a. a document support for imparting an arcuate shape having a predetermined axis to documents placed thereon;

b. means for moving arcuately shaped documents in the direction of said predetermined axis;

c. a fixed planar linear array of photosensors for sensing light reflected from a document on said support, said array being arranged in such a way that said predetermined axis lies inside of the plane defined by said array;

d. a projection lamp having a filament arranged inside said plane defined by said array and confined to said plane and positioned along said predetermined axis;

e. a rotatable lens support having an axis of rotation coaxial with said predetermined axis;

f. first lens means on said lens support directing light from said filament of said projection lamp to documents on said documemt support;

g. second lens means on said lens support focusing images of points of documents on said document support at the plane defined by said array and coextensive with said predetermined axis; and h. said first lens means and said second lens means being the only optical elements determining the geometry of the path of light from said filament to said array.

15. An electro-optical reader for translating information printed on a document into electric signals including a. a fixed planar array of photosensors;

b. a single substantially linear light source arranged in the plane defined by said array, said linear light source being formed by a helically wound projection lamp filament;

c. means for imparting such an arcuate shape to a document that the axis of said arcuate shape lies inside of the plane defined by said array in coaxial relation with said linear light source;

d. means for moving arcuately shaped documents in the direction of said linear light source;

e. a rotatable lens support having its axis of rotation arranged in coaxial relation with said linear light source;

f. first lens means fixedly mounted on said lens support directing light from said linear light source upon an arcuately shaped document;

g. second lens means fixedly mounted on said lens support focusing images of points on an arcuately shaped document at the region of the plane defined by said array coextensive with said axis of said arcuate shape; and h. said first lens means and said second lens means being the only means determining the geometry of the path of light from said linear light source to said array.

* * * * *